(12) United States Patent
Labuschagne et al.

(10) Patent No.: US 8,816,652 B2
(45) Date of Patent: *Aug. 26, 2014

(54) SYSTEMS AND METHODS FOR SYNCHRONIZED CONTROL OF ELECTRICAL POWER SYSTEM VOLTAGE PROFILES

(71) Applicant: Schweitzer Engineering Laboratories, Inc., Pullman, WA (US)

(72) Inventors: Casper A. Labuschagne, Pullman, WA (US); Jeffrey G. Pope, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/918,640

(22) Filed: Jun. 14, 2013

(65) Prior Publication Data

US 2013/0282197 A1   Oct. 24, 2013

Related U.S. Application Data

(63) Continuation of application No. 12/903,038, filed on Oct. 12, 2010, now Pat. No. 8,476,874.

(60) Provisional application No. 61/251,180, filed on Oct. 13, 2009.

(51) Int. Cl.
*G05F 1/70* (2006.01)
*H02J 3/18* (2006.01)
*G06F 1/26* (2006.01)

(52) U.S. Cl.
CPC .................. *G06F 1/26* (2013.01); *H02J 3/1878* (2013.01); *Y02E 40/30* (2013.01)
USPC .......................................... 323/211; 323/258

(58) Field of Classification Search
CPC ............. G05F 1/14; G05F 1/17; G05F 1/704; H02J 3/1807; H02J 3/1828; H02J 3/1864; H02J 3/1878

USPC ......... 323/208, 209, 210, 211, 255, 256, 257, 323/258
See application file for complete search history.

(56) References Cited

U.S. PATENT DOCUMENTS 3,702,379 A    11/1972   Peterson
4,015,206 A     3/1977   Huntley
(Continued)

FOREIGN PATENT DOCUMENTS

EP    0175120    8/1992
EP    0231528    3/1994
(Continued)

OTHER PUBLICATIONS

PCT/US2010/052449 PCT International Search Report and Written Opinion of the International Searching Authority, Dec. 9, 2010.

(Continued)

*Primary Examiner* — Jeffrey Sterrett
(74) *Attorney, Agent, or Firm* — Jared L. Cherry

(57) ABSTRACT

Disclosed herein are various embodiments of systems and methods for controlling a voltage profile delivered to a load in an electric power system. According to various embodiments, an electric power system may include an electric power line, a variable tap transformer, and a capacitor bank. The variable tap transformer may include a plurality of tap positions. A tap change controller may be coupled with the variable tap transformer and may control the tap positions of the variable tap transformer. A capacitor bank controller may be coupled with the capacitor bank and may selectively couple the capacitor bank to the electric power line. The tap change controller and the capacitor bank controller may share system information related to the voltage profile along the electric power line and to change the voltage profile along the line using the variable tap transformer and the capacitor bank depending on the system information.

20 Claims, 4 Drawing Sheets

(56) References Cited

U.S. PATENT DOCUMENTS

| | | |
|---|---|---|
| 4,020,396 A | 4/1977 | Gamble |
| 4,148,087 A | 4/1979 | Phadke |
| 4,276,605 A | 6/1981 | Okamoto |
| 4,413,189 A | 11/1983 | Bottom |
| 4,419,619 A | 12/1983 | Jindrick |
| 4,420,805 A | 12/1983 | Yamaura |
| 4,502,086 A | 2/1985 | Ebisaka |
| 4,528,611 A | 7/1985 | Udren |
| 4,551,718 A | 11/1985 | Cookson |
| 4,561,120 A | 12/1985 | Andow |
| 4,612,617 A | 9/1986 | LaPlace |
| 4,620,257 A | 10/1986 | Sano |
| 4,623,834 A | 11/1986 | Klingbiel |
| 4,630,220 A | 12/1986 | Pickinpaugh |
| 4,636,909 A | 1/1987 | Brandt |
| 4,672,501 A | 6/1987 | Bilac |
| 4,695,737 A | 9/1987 | Rabon |
| 4,715,000 A | 12/1987 | Premerlani |
| 4,731,689 A | 3/1988 | Nimmersjo |
| 4,821,137 A | 4/1989 | Wilkinson |
| 4,829,298 A | 5/1989 | Fernandes |
| 4,871,971 A | 10/1989 | Jeerings |
| 4,886,952 A | 12/1989 | Horiuchi |
| 4,889,383 A | 12/1989 | Jones |
| 4,896,241 A | 1/1990 | Li |
| 4,899,383 A | 2/1990 | Einolf, Jr. |
| 4,935,837 A | 6/1990 | Sun |
| 4,972,290 A | 11/1990 | Sun |
| 5,006,846 A | 4/1991 | Granville |
| 5,055,766 A | 10/1991 | McDermott |
| 5,069,521 A | 12/1991 | Hardwick |
| 5,095,399 A | 3/1992 | Terada |
| 5,117,174 A | 5/1992 | Kessler |
| 5,136,233 A | 8/1992 | Klinkenberg |
| 5,185,736 A | 2/1993 | Tyrrell |
| 5,210,443 A | 5/1993 | Kugler |
| 5,218,465 A | 6/1993 | Lebby |
| 5,224,011 A | 6/1993 | Yalla |
| 5,235,599 A | 8/1993 | Nishimura |
| 5,267,231 A | 11/1993 | Dzieduszko |
| 5,283,781 A | 2/1994 | Buda |
| 5,293,295 A | 3/1994 | Nishitani |
| 5,311,508 A | 5/1994 | Buda |
| 5,315,527 A | 5/1994 | Beckwith |
| 5,317,472 A | 5/1994 | Schweitzer, III |
| 5,341,268 A | 8/1994 | Ishiguro |
| 5,367,426 A | 11/1994 | Schweitzer, III |
| 5,371,736 A | 12/1994 | Evan |
| 5,398,029 A | 3/1995 | Toyama |
| 5,402,057 A | 3/1995 | D'Aquila |
| 5,428,553 A | 6/1995 | Chiba |
| 5,430,598 A | 7/1995 | Rodolfo |
| 5,446,682 A | 8/1995 | Janke |
| 5,450,002 A | 9/1995 | Dunk |
| 5,451,923 A | 9/1995 | Seberger |
| 5,455,505 A | 10/1995 | Laplace |
| 5,461,607 A | 10/1995 | Miyagi |
| 5,466,973 A | 11/1995 | Griffioen |
| 5,473,608 A | 12/1995 | Gagne |
| 5,481,532 A | 1/1996 | Hassan |
| 5,498,956 A | 3/1996 | Kinney |
| 5,500,806 A | 3/1996 | Bellin |
| 5,510,697 A | 4/1996 | Dormer |
| 5,530,338 A | 6/1996 | Beckwith |
| 5,541,498 A | 7/1996 | Beckwith |
| 5,544,064 A | 8/1996 | Beckwith |
| 5,550,460 A | 8/1996 | Bellin |
| 5,552,696 A | 9/1996 | Trainor |
| 5,568,398 A | 10/1996 | Trainor |
| 5,576,625 A | 11/1996 | Sukegawa |
| 5,581,173 A | 12/1996 | Yalla |
| 5,592,393 A | 1/1997 | Yalla |
| 5,621,439 A | 4/1997 | Okada |
| 5,642,007 A | 6/1997 | Gyugi |
| 5,646,512 A | 7/1997 | Beckwith |
| 5,680,324 A | 10/1997 | Schweitzer |
| 5,721,689 A | 2/1998 | Hart |
| 5,793,750 A | 8/1998 | Schweitzer, III |
| 5,805,395 A | 9/1998 | Hu |
| 5,809,045 A | 9/1998 | Adamiak |
| 5,838,525 A | 11/1998 | Ward |
| 5,844,550 A | 12/1998 | Trainor |
| 5,889,474 A | 3/1999 | Ladue |
| 5,932,997 A | 8/1999 | James |
| 5,940,026 A | 8/1999 | Popeck |
| 5,982,595 A | 11/1999 | Pozzuoli |
| 5,995,911 A | 11/1999 | Hart |
| 6,005,759 A | 12/1999 | Hart |
| 6,121,886 A | 9/2000 | Andersen |
| 6,137,277 A | 10/2000 | Rajda |
| 6,141,196 A | 10/2000 | Premerlani |
| 6,148,267 A | 11/2000 | Premerlani |
| 6,160,806 A | 12/2000 | Cantwell |
| 6,236,949 B1 | 5/2001 | Hart |
| 6,288,881 B1 | 9/2001 | Melvin |
| 6,311,307 B1 | 10/2001 | Adamiak |
| 6,313,614 B1 | 11/2001 | Persson |
| 6,324,039 B1 | 11/2001 | Gross |
| 6,366,864 B1 | 4/2002 | Kulidjian |
| 6,404,655 B1 | 6/2002 | Welches |
| 6,426,856 B1 | 7/2002 | Schneerson |
| 6,446,682 B1 | 9/2002 | Viken |
| 6,456,947 B1 | 9/2002 | Adamiak |
| 6,469,629 B1 | 10/2002 | Campbell |
| 6,507,178 B2 | 1/2003 | Cocetta |
| 6,571,182 B2 | 5/2003 | Adamiak |
| 6,573,631 B2 | 6/2003 | Ma |
| 6,603,298 B2 | 8/2003 | Guzman-Casillas |
| 6,633,998 B1 | 10/2003 | Lau |
| 6,662,124 B2 | 12/2003 | Schweitzer, III et al. |
| 6,717,394 B2 | 4/2004 | Elms |
| 6,768,370 B2 | 7/2004 | Takahashi |
| 6,795,789 B2 | 9/2004 | Vandiver |
| 6,815,932 B2 | 11/2004 | Wall |
| 6,845,333 B2 | 1/2005 | Anderson |
| 6,911,853 B2 | 6/2005 | Kizer |
| 6,934,654 B2 | 8/2005 | Benmouyal |
| 6,947,264 B2 | 9/2005 | Gill |
| 6,990,395 B2 | 1/2006 | Ransom |
| 7,027,896 B2 | 4/2006 | Thompson |
| 7,230,809 B2 | 6/2007 | Whitehead |
| 7,271,572 B2 | 9/2007 | Labuschagne |
| 7,304,403 B2 | 12/2007 | Xu |
| 7,328,114 B2 | 2/2008 | Premerlani |
| 7,432,618 B2 | 10/2008 | Taylor |
| 7,453,674 B2 | 11/2008 | Kuehnle |
| 7,463,467 B2 | 12/2008 | Lee |
| 7,504,806 B2 | 3/2009 | Labuschagne |
| 7,630,863 B2 | 12/2009 | Zweigle |
| 7,714,592 B2 | 5/2010 | Radtke |
| 7,788,731 B2 | 8/2010 | Morris |
| 7,930,117 B2 | 4/2011 | Guzman-Casillas |
| 8,275,485 B2 | 9/2012 | Schweitzer |
| 8,275,486 B2 | 9/2012 | Schweitzer |
| 8,275,487 B2 | 9/2012 | Schweitzer |
| 8,476,874 B2 * | 7/2013 | Labuschagne et al. ....... 323/211 |
| 2001/0012984 A1 | 8/2001 | Adamiak |
| 2002/0006199 A1 | 1/2002 | Sako |
| 2002/0046354 A1 | 4/2002 | Ostrom |
| 2002/0080091 A1 | 6/2002 | Acharya |
| 2002/0173927 A1 | 11/2002 | Vandiver |
| 2003/0016001 A1 | 1/2003 | Borup |
| 2004/0186669 A1 | 9/2004 | Benmouyal |
| 2005/0276133 A1 | 12/2005 | Harding |
| 2005/0280965 A1 | 12/2005 | Lee |
| 2006/0069522 A1 | 3/2006 | Bruno |
| 2006/0095507 A1 | 5/2006 | Watson |
| 2006/0193099 A1 | 8/2006 | Schweitzer |
| 2006/0247874 A1 | 11/2006 | Premerlani |
| 2007/0008033 A1 | 1/2007 | Okazaki |
| 2007/0086134 A1 | 4/2007 | Zweigle |
| 2007/0090811 A1 | 4/2007 | Labuschagne |
| 2007/0136013 A1 | 6/2007 | Premerlani |
| 2007/0285079 A1 | 12/2007 | Nasle |

(56) References Cited

U.S. PATENT DOCUMENTS

| | | |
|---|---|---|
| 2008/0103631 A1 | 5/2008 | Koliwad |
| 2008/0122293 A1 | 5/2008 | Ohm |
| 2008/0157748 A1 | 7/2008 | Berggren |
| 2009/0096211 A1 | 4/2009 | Stiesdal |
| 2009/0187284 A1 | 7/2009 | Kreiss |
| 2009/0254655 A1 | 10/2009 | Kidwell |
| 2010/0161263 A1 | 6/2010 | Benmouyal |
| 2011/0084672 A1 | 4/2011 | Labuschagne |
| 2011/0251432 A1 | 10/2011 | Schweitzer |
| 2012/0133209 A1 | 5/2012 | O'Brien |
| 2012/0193984 A1 | 8/2012 | Krok |
| 2012/0323397 A1 | 12/2012 | Schweitzer |

FOREIGN PATENT DOCUMENTS

| | | |
|---|---|---|
| EP | 0455314 | 11/1994 |
| EP | 0525428 | 11/1995 |
| EP | 0437861 | 6/1996 |
| EP | 0488123 | 6/1996 |
| EP | 0554553 | 7/1996 |
| EP | 0384435 | 8/1996 |
| JP | 54105750 | 8/1979 |
| JP | 54132747 | 10/1979 |
| JP | 1268423 | 10/1989 |
| JP | 1303011 | 12/1989 |
| JP | 2013220 | 1/1990 |
| JP | 2106126 | 4/1990 |
| WO | 8600488 | 1/1986 |
| WO | 8805543 | 7/1988 |
| WO | 8909411 | 10/1989 |
| WO | 9524014 | 9/1995 |
| WO | 2004001431 | 12/2003 |

OTHER PUBLICATIONS

Edmund O. Schweitzer, III, David Whitehead, Armando Guzman, Yanfeng Gong, Marcos Donolo, Advanced Real-Time Synchrophasor Applications, Oct. 2008.

Edmund O. Schweitzer, III, Jolene Schafman, Unified Shunt Capacitor Bank Control Protection, May 1, 1991.

Gustabo Brunello, Bogdan Kasztenny, Craig Wester, Shunt Capacitor Bank Fundamentals and Protection, Apr. 8, 2003.

Cooper Power Systems, Voltage Regulators, CL-6 Series Control Installation, Operation, and Maintenance Instructions, S225-11-1 www.cooperpower.com, 2004.

Operating Instructions BA 225/02, Voltage Regulator TAPCON 230, www.reinhausen.com Feb. 13, 2006.

Translation of Siemen letter dated 14.6.2004 to EPO Munich, in opposition to EP 0810714.

7SD512 V3 Digitaler Stromvergleichsschults fur Leitungen, Geratehandbuch der Siemens Ag, 1995 order no. C53000-G1100-C105-1.

A numberical Current Comparison Protection With Digital Measured Value Transmission Over Fibre Optic Cable, Koch et al., Southern African Conference on Power System Protection, Sep. 1991.

A New Approach to Digital Current Differential Protection for Low and Medium Voltage Feeder Circuits Using a Digital Voice-Frequency Grade Communications Channel, Redfern, et al. IEEE Transactions on Power Delivery Jul. 9, 1994, No. 3, New York, US.

Confirmation From a customer (Eskom) of Siemens AG from South Africa.

Delivery note for current comparison protection devices 7SD512 dated Feb. 1996.

Statutory Declaration by Mr. Staasmeier.

Acceptance report on 7SD512 apparatus (take-over report dated Nov. 27, 1996).

Schweitzer Engineering Laboratories, Inc., SEL-2505 Remote I/O Module-Increase Reliability, Enhance Safety, Reduce Costs, Sep. 15, 2008, www.selinc.com.

Schweitzer III, Four New Digital Relays for Overhead Transmission Line Protection, 12th Annual Western Protective Relay Conference, Oct. 22-24, 1985.

PCT/US2007/020369 Patent cooperation Treaty, From the International Bureau, PCT Notification Concerning Transmittal of International Preliminary Report on Patentability (Chapter 1 of Patent Cooperation Treaty), Date of Mailing: Apr. 9, 2009, Applicant Schweitzer Engineering Laboratories, Inc.

* cited by examiner

SYSTEMS AND METHODS FOR SYNCHRONIZED CONTROL OF ELECTRICAL POWER SYSTEM VOLTAGE PROFILES

RELATED APPLICATIONS

This application claims priority under 35 U.S.C. §119(e) to U.S. Provisional Patent Application No. 61/251,180, filed Oct. 13, 2009, and entitled "SYNCHRONIZED REAL-TIME CONTROL FOR OPTIMIZING SYSTEM VOLTAGE PROFILES," and U.S. patent application Ser. No. 12/903,038, and entitled "SYSTEMS AND METHODS FOR SYNCHRONIZED CONTROL OF ELECTRICAL POWER SYSTEM VOLTAGE PROFILES," which are hereby incorporated by reference in their entirety.

TECHNICAL FIELD

This disclosure relates to systems and methods for controlling electrical power system voltage profiles and, more particularly, to systems and methods for controlling electrical power system voltage profiles using capacitor banks and on-load tap changers.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
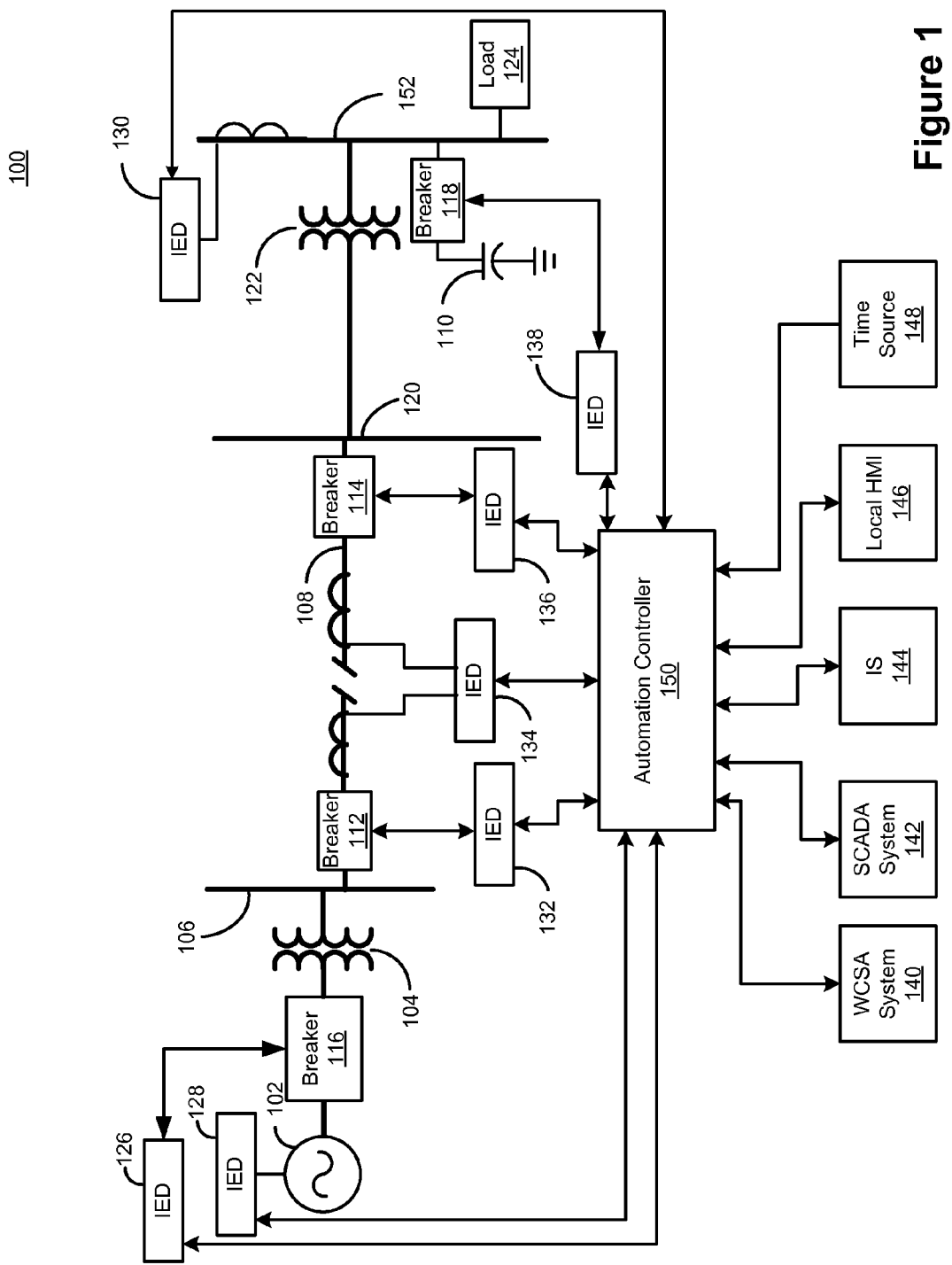
FIG. 1 illustrates a simplified diagram of an electric power delivery system.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

Several aspects of the embodiments described are illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer (or other electronic device) to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Electrical power generation and delivery systems are designed to generate, transmit, and distribute electric energy to loads. Electrical power generation and delivery systems may include equipment such as electrical generators, electrical motors, power transformers, power transmission and distribution lines, circuit breakers, switches, buses, transmission lines, voltage regulators, capacitor banks, and the like. Such equipment may be monitored, controlled, automated, and/or protected using intelligent electronic devices (IEDs) that receive electric power system information from the equipment, make decisions based on the information, and provide monitoring, control, protection, and/or automation outputs to the equipment.

Consistent with embodiments disclosed herein, electrical power generation and delivery system equipment may be monitored and protected from various malfunctions and/or conditions using one or more IEDs. For example, an IED may be configured to protect the electrical power system equipment from abnormal conditions such as electrical short circuits, voltage overloads, frequency excursions, voltage functions, and the like. In some embodiments, to protect electrical power system equipment, an IED may isolate equipment from the rest of a system upon detecting an abnormal condition (e.g., a fault) in the equipment and/or the system.

To protect a variety of electrical power system equipment, a variety of IEDs designed to protect different equipment may be included in the system. Such IEDs may include one or more protective relays, tap change controllers, shunt capacitor bank controllers, differential relays, directional relays, bus protection relays, transformer protection relays, and the like. In some embodiments, an electrical power generation and delivery system may include shunt capacitor banks (SCBs)

configured to provide capacitive reactive power support and compensation in high and/or low voltage situations in the electrical power system. For example, when reactive power or voltage along a transmission or distribution line included in the electrical power system is below a specified threshold, the shunt capacitors capacitor banks within the (s)SCB may be switched on to maintain the reactive power or voltage levels and/or range of levels along the transmission line at a certain specified voltage level and/or range of voltage levels. In some embodiments, the functionality of the SCB may be controlled using an IED.

An electrical power generation and delivery system may further include an on-load tap changer (OLTC) configured to control the voltage of electric power delivered to loads associated with the electrical power system. In some embodiments, an OLTC may include a transformer with one or more windings that includes variable and/or set tap points that can be adjusted to deliver a specified voltage output. In certain embodiments, as described in detail below, the tap points of the transformer in an OLTC may be adjusted to deliver a voltage output having a specified voltage profile to one or more loads included in an electrical power system. Like the SCB, the functionality of the OLTC may be controlled using an IED.

FIG. 1 illustrates a simplified diagram of an electric power generation and delivery system 100 consistent with embodiments disclosed herein. The electric power generation and delivery system 100 may include, among other things, an electric generator 102, configured to generate an electrical power output, which in some embodiments may be a sinusoidal waveform. Although illustrated as a one-line diagram for purposes of simplicity, electrical power generation and delivery system 100 may also be configured as three phase power system.

A step-up power transformer 104 may be configured to increase the output of the electric generator 102 to a higher voltage sinusoidal waveform. A bus 106 may distribute the higher voltage sinusoidal waveform to a transmission line 108 that in turn may connect to a bus 120. In certain embodiments, the system 100 may further include one or more breakers 112-118 that may be configured to be selectively actuated to reconfigure electric power delivery system 100. A step down power transformer 122 may be configured to transform the higher voltage sinusoidal waveform to lower voltage sinusoidal waveform that is suitable for delivery to a load 124.

The IEDs 126-138, illustrated in FIG. 1, may be configured to control, monitor, protect, and/or automate the electric power system 100. As used herein, an IED may refer to any microprocessor-based device that monitors, controls, automates, and/or protects monitored equipment within an electric power system. An IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. In some embodiments, IEDs 126-138 may gather status information from one or more pieces of monitored equipment. Further, IEDs 126-138 may receive information concerning monitored equipment using sensors, transducers, actuators, and the like. Although FIG. 1 illustrates separate IEDs monitoring a signal (e.g., IED 134) and controlling a breaker (e.g., IED 136), these capabilities may be combined into a single IED.

FIG. 1 illustrates various IEDs 126-138 performing various functions for illustrative purposes and does not imply any specific arrangements or functions required of any particular IED. In some embodiments, IEDs 126-138 may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. Further, IEDs 126-138 may be configured to communicate calculations, such as phasors (which may or may not be synchronized as synchrophasors), events, fault distances, differentials, impedances, reactances, frequency, and the like. IEDs 126-138 may also communicate settings information, IED identification information, communications information, status information, alarm information, and the like. Information of the types listed above, or more generally, information about the status of monitored equipment, may be generally referred to herein as monitored system data.

In certain embodiments, IEDs 126-138 may issue control instructions to the monitored equipment in order to control various aspects relating to the monitored equipment. For example, an IED (e.g., IED 136) may be in communication with a circuit breaker (e.g., breaker 114), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device to perform a certain action, may be generally referred to as control instructions.

IEDs 126-138 may be communicatively linked together using a data communications network, and may further be communicatively linked to a central monitoring system, such as a supervisory control and data acquisition (SCADA) system 142, an information system (IS) 144, and/or wide area control and situational awareness (WCSA) system 140. The embodiments illustrated in FIG. 1 are configured in a star topology having an automation controller 150 at its center, however, other topologies are also contemplated. For example, the IEDs 126-138 may be communicatively coupled directly to the SCADA system 142 and/or the WCSA system 140. The data communications network of the system 100 may utilize a variety of network technologies, and may comprise network devices such as modems, routers, firewalls, virtual private network servers, and the like. Further, in some embodiments, the IEDs 126-138 and other network devices may be communicatively coupled to the communications network through a network communications interface.

Consistent with embodiments disclosed herein, IEDs 126-138 may be connected at various points to the electric power generation and delivery system 100. For example, IED 134 may monitor conditions on transmission line 108. IEDs 126, 132, 136, and 138 may be configured to issue control instructions to associated breakers 112-118. IED 130 may monitor conditions on a bus 152. IED 128 may monitor and issue control instructions to the electric generator 102, while IED 126 may issue control instructions to breaker 116.

In certain embodiments, various IEDs 126-138 and/or higher level systems (e.g., SCADA system 142 or IS 144) may be facilitated by the automation controller 150. The automation controller 150 may also be referred to as a central IED or access controller. In various embodiments, the automation controller 150 may be embodied as the SEL-2020, SEL-2030, SEL-2032, SEL-3332, SEL-3378, or SEL-3530 available from Schweitzer Engineering Laboratories, Inc. of Pullman, Wash., and also as described in U.S. Pat. No. 5,680,324, U.S. Pat. No. 7,630,863, and U.S. Patent Application Publication No. 2009/0254655, the entireties of which are incorporated herein by reference.

IEDs 126-138 may communicate information to the automation controller 150 including, but not limited to, status and control information about the individual IEDs 126-138, IED settings information, calculations made by the individual IEDs 126-138, event (e.g., a fault) reports, communications network information, network security events, and the like. In some embodiments, the automation controller 150 may be directly connected to one or more pieces of monitored equipment (e.g., electric generator 102 or breakers 112-118).

The automation controller 150 may also include a local human machine interface (HMI) 146. In some embodiments, the local HMI 146 may be located at the same substation as automation controller 150. The local HMI 146 may be used to change settings, issue control instructions, retrieve an event report, retrieve data, and the like. The automation controller 150 may further include a programmable logic controller accessible using the local HMI 146. A user may use the programmable logic controller to design and name time coordinated instruction sets that may be executed using the local HMI 146. In some embodiments, the time coordinated instruction sets may be stored in computer-readable storage medium (not shown) on automation controller 150.

In certain embodiments, a time coordinated instruction set may be developed outside the automation controller 150 (e.g., using WCSA system 140, or SCADA system 142) and transferred to the automation controller 150 or through the automation controller 150 to the IEDs 126-138 or, in other embodiments without the automation controller 150, directly to the IEDs 126-138, using a communications network, using a USB drive, or the like. For example, time coordinated instruction sets may be designed and transmitted via WCSA system 140. Further, in some embodiments, the automation controller 150 or IEDs 126-138 may be provided from the manufacturer with pre-set time coordinated instruction sets. U.S. patent application Ser. No. 11/089,818 (U.S. Patent Application Publication Number 2006/0218360) titled Method and Apparatus for Customization, describes such a method, and is hereby incorporated by reference in its entirety.

The automation controller 150 may also be communicatively coupled to a time source (e.g., a clock) 148. In certain embodiments, the automation controller 150 may generate a time signal based on the time source 148 that may be distributed to communicatively coupled IEDs 126-138. Based on the time signal, various IEDs 126-138 may be configured to collect time-aligned data points including, for example, synchrophasors, and to implement control instructions in a time coordinated manner. In some embodiments, the WCSA system 140 may receive and process the time-aligned data, and may coordinate time synchronized control actions at the highest level of the electrical power generation and delivery system 100. In other embodiments, the automation controller 150 may not receive a time signal, but a common time signal may be distributed to IEDs 126-138.

The time source 148 may also be used by the automation controller 150 for time stamping information and data. Time synchronization may be helpful for data organization, real-time decision-making, as well as post-event analysis. Time synchronization may further be applied to network communications. The time source 148 may be any time source that is an acceptable form of time synchronization, including, but not limited to, a voltage controlled temperature compensated crystal oscillator, Rubidium and Cesium oscillators with or without a digital phase locked loops, microelectromechanical systems (MEMS) technology, which transfers the resonant circuits from the electronic to the mechanical domains, or a global positioning system (GPS) receiver with time decoding. In the absence of a discrete time source 148, the automation controller 150 may serve as the time source 148 by distributing a time synchronization signal.

To maintain voltage and reactive power within certain limits for safe and reliable power delivery, an electrical power generation and delivery system may include SCBs (e.g., capacitor 110) configured to provide capacitive reactive power support and compensation in high and/or low voltage conditions within the electrical power system. For example, when power along a transmission line included in the electrical power system meets certain predetermined criteria, the capacitors within the SCB may be switched on (e.g., via breaker 118) by an IED to maintain a proper balance of reactive power. Further, an electrical power generation and delivery system may include an OLTC configured to control the quality of electric power delivered to loads associated with the electrical power system by varying transformer tap positions within the OLTC. Like the SCB, the functionality of the OLTC may be controlled using an IED.

Figure 2:
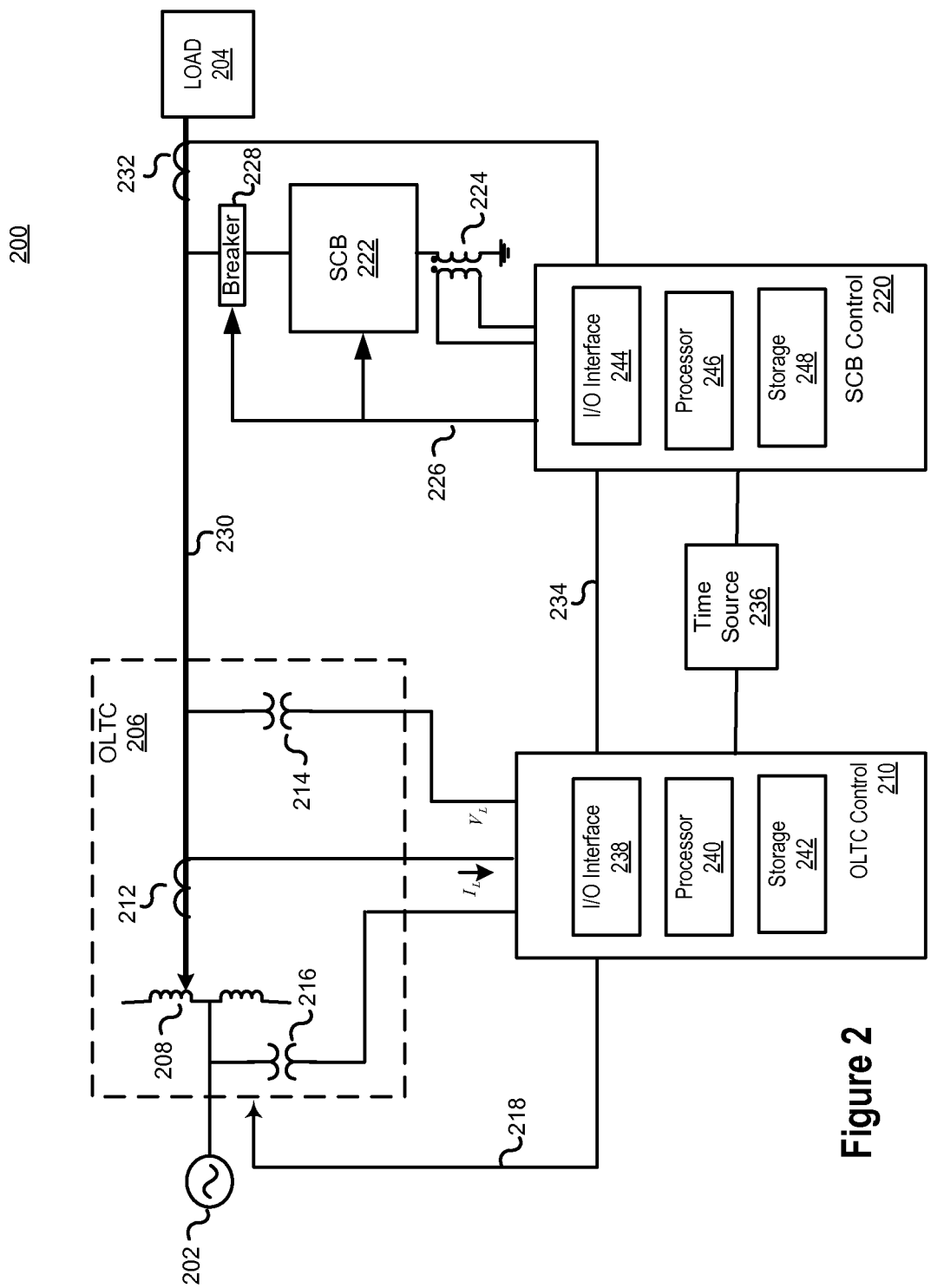
FIG. 2 illustrates a block diagram of an electric power delivery system including an on-load tap changer and a shunt capacitor bank system.

FIG. 2 illustrates a block diagram of an electric power generation and delivery system 200 including an OLTC 206 and an SCB 222 system consistent with embodiments disclosed herein. Although illustrated as single phase one-line 230 system for purposes of simplicity, electrical power generation and delivery system 200 may also be configured as three phase power system.

The OLTC 206 may be communicatively coupled to an IED generally described herein as an OLTC control module 210. The OLTC control module 210 may receive monitored system data from the OLTC 206. In certain embodiments, the OLTC control module 210 may be configured to utilize monitored system current and voltage signals at levels less than those present in the OLTC 206 and/or on the line 230. Accordingly, the OLTC control module 210 may be coupled to the line 230 via a step down voltage transformer 214 and/or a current transformer 212. The step down voltage transformer 214 may be configured to step down the voltage along the line 230 to a secondary voltage $V_L$, having a magnitude that can be monitored and measured by the OLTC control module 210 (e.g., from a line 230 voltage of 12 kV to an OLTC control module 210 voltage of 120V). Similarly, the current transformer 212 may be configured to step down the line 230 current to a secondary current $I_L$ having a magnitude that can be monitored and measured by the OLTC control module 210 (e.g., from a line 230 current of 200 amps to a OLTC control module 210 current of 0.2 amps). In certain embodiments, the OLTC 206 may further include a second step down voltage transformer 216 for use during a reverse load condition, wherein the generator 202 may be switched into the system on the load side. While the step down voltage transformers 214 and 216 and/or current transformer 212 are illustrated in FIG. 2 as being included in the OLTC 206, other configurations of the OLTC 206, the OLTC control module 210, the step down voltage transformers 214 and 216, and/or the current transformer 212 may also be implemented.

In certain embodiments, the OLTC control module 210 may include a processor 240 and/or microcontroller (not shown) configured to receive the secondary voltage $V_L$ and secondary current $I_L$ signals, filter the signals, and process the signals to calculate phasors having magnitudes and phase angles corresponding to the signals. The phasors may be used by the processor and/or microcontroller included in the OLTC control module 210 to determine whether a tap change in a variable tap transformer 208 included in the OLTC 210 is needed to adjust the voltage profile provided to the load 204 into a center-band or specified voltage profile (e.g., 120V). If such an adjustment is needed, the OLTC control module 210 may direct the OLTC 206 to make such an adjustment to the variable tap transformer 208 by issuing control instructions via a control line 218. In certain embodiments, the OLTC control module 210 may be configured to account for line resistances and reactances of the line 230 in directing the OLTC 206 to adjust the voltage profile provided to the load 204. Further, in some embodiments, the OLTC control module 210 may be determined based on the calculated phasors whether the voltage profile of the measured signal along the line 230 is within a certain range of specified voltage profiles and, if the measured voltage profile is outside such a range, direct the OLTC 206 to make needed adjustments.

Figure 3:
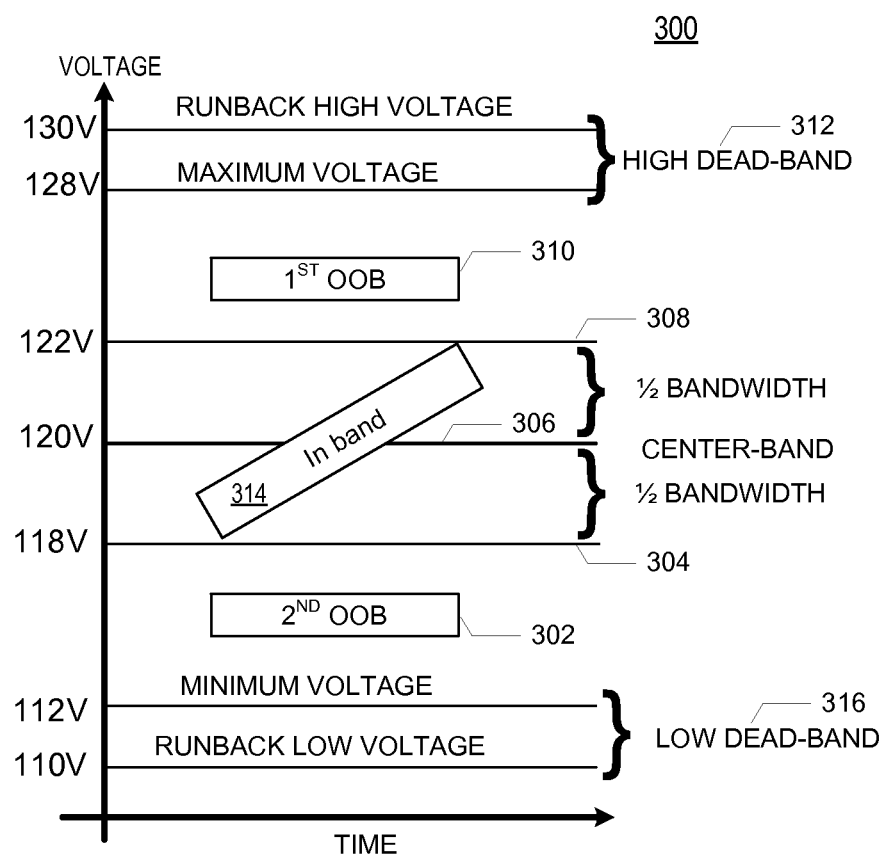
FIG. 3 illustrates a diagram of a voltage profile for an on-load tap change controller.

FIG. 3 illustrates a diagram of a voltage profile 300 for an OLTC control module. As shown in FIG. 3, a specified voltage profile 300 may include an in-band area 314 representing a voltage range around a center band 306 voltage level between out-of-band (OOB) voltage levels 304 and 308. A high OOB area 310 may extend between a maximum voltage and OOB voltage level 304. Similarly, a low OOB area 302 may extend between a minimum voltage and OOB voltage level 304. Although FIG. 3 includes specified voltage levels for discussion purposes, other voltage levels may be used.

In the illustrated example, a center-band voltage 306 in a specified voltage profile may be at 120V. The center-band voltage 306 may be included within an in-band area 314 specified to have a range of 120V±2V (i.e., a total range of 4V). A high OOB area 310 may extend between a maximum voltage of 128V and an OOB voltage level 308 of 122V. Similarly, a low OOB area 302 may extend between a minimum voltage of 112V and an OOB voltage level 304 of 118V.

Consistent with embodiments disclosed herein, when a measured voltage profile received by an OLTC control module (e.g., OLTC control module 210) is within the high OOB area 310, the OLTC control module may direct the variable tap transformer included in an OLTC (e.g., OLTC 206) to adjust its tap such that the measured voltage profile returns to the in-band area 314 by, for example, issuing a corresponding command to the OLTC. Similarly, when a measured voltage profile received by an OLTC control module is within the low OOB area 302, the OLTC control module may direct the variable tap transformer included in the OLTC to adjust its tap such that the measured voltage profile returns to the in-band area 314 by issuing a corresponding command to the OLTC. In some embodiments, the command issued by the OLTC control module to the OLTC may direct the OLTC to adjust its tap, but to do so in a time-controlled manner so as to not cause abrupt changes in the voltage profile along the transmission line.

In certain embodiments, a specified voltage profile 300 may include a high dead-band area 312 between a maximum voltage of, for example, 128V, and a runback high voltage of, for example, 130V. If a measured voltage profile received by an OLTC control module is within or above the high dead-band area 312 (i.e., indicating an extreme voltage condition), the OLTC control module may direct the OLTC to adjust its tap more rapidly (e.g., with little or no time delay) such that the measured voltage profile returns to the in-band area 314 prior to damaging any components of the electrical power system delivery system. The OLTC control module may direct the OLTC similarly when the measured voltage profile is within or below a low dead-band area 316 between a minimum voltage (e.g., 112V) and a runback low voltage (e.g., 110V). Further, in some embodiments, the OLTC control module may only direct the OLTC to adjust its tap to return the measured voltage profile returns to the in-band area when the measured voltage is within or above the high dead-band area 312 or within or below the low dead-band area 316.

Referring back to FIG. 2, an SCB system 222 may be included in the electric power generation and delivery system 200 in addition to the OLTC 206. In certain embodiments, the SCB system 222 may be coupled between the line 230 and ground. In some embodiments, signals (e.g., monitored system data and the like) may be received by the OLTC control module 210 via an OLTC interface 238 configured to communicatively interface the OLTC control module 210 with other components of the system 200. The functionality of the OLTC control module 210 disclosed herein may be implemented using processor-executable instructions stored on a computer-readable storage medium 242 included within and/or external to the OLTC control module 210. In certain embodiments, the instructions stored on the computer-readable storage medium 242 may define functional modules that when executed by the processor 240 cause the processor 240 to perform the disclosed methods and functions of the OLTC control module 210.

As previously discussed, the SCB system 222 may include one or more capacitors configured to provide capacitive reactive power compensation in high and/or low voltage situations in the electrical power system 200. For example, when the voltage profile along the line 230 meets certain predetermined criteria, capacitors within the SCB 222 may be switched on via a breaker 228 to maintain the power along the line 230 at a certain specified voltage profile.

The SCB system 222 may be communicatively coupled to an IED generally described herein as an SCB control module 220. The SCB control module 220 may be configured to control the functionality of SCB system 222. The SCB control module 220 may receive monitored system data from the SCB 222 and/or the line 230. For example, the SCB control module 220 may receive monitored system data relating the measured current through the line 230 via a current transformer 232. Further, the SCB control module 220 may receive line 230 voltage signals using potential transformers (not shown) connected to either the line 230, the branch the SCB system 222 is coupled to, or within the SCB system 222 itself. In some embodiments, the SCB control module 220 may further receive voltage information from a neutral side of the SCB system 222 and ground using a potential transformer 224.

In some embodiments, signals (e.g., monitored system data and the like) may be received by the SCB control module 220 via a SCB interface 244 configured to communicatively interface the SCB control module 220 with other components of the system 200. The SCB control module 220 may include one or more processors 246 configured to execute instructions stored on a computer-readable storage medium 248 included within the SCB control module 220 and/or external to the SCB control module 220. In certain embodiments, the instructions stored on the computer-readable storage medium 248 may define functional modules that when executed by the processor 246 cause the processor 246 to perform the disclosed methods and functions of the SCB control module 220. For example, consistent with some embodiments, the processor 246 of the SCB control module 220 may be configured to determine if electric power delivered to the load 204 is within certain parameters in terms of the reactive power delivered thereto. If the delivered reactive power is not within certain parameters, the SCB control module 220 may direct the SCB 222 to be activated via control line 226 coupled to the SCB interface 244 using, for example, the breaker 228.

In some electric power delivery systems 200, the OLTC 206 and the SCB 222 may operate independently of each other. In some circumstances, however, independent operation of the OLTC 206 and SCB 222 may cause unnecessary switching operations in both devices. For example, in certain conditions, controlling a voltage profile delivered to the load 204 may be better achieved by utilizing the OLTC 206 rather than the SCB 222. Similarly, in certain other conditions, controlling a voltage profile delivered to the load 204 may be better achieved by utilizing the SCB 222 rather than the OLTC 206.

Consistent with some embodiments, the OLTC control module 210 and the SCB control module 220 may operate together to coordinate the operation of the OLTC 206 and SCB 222 based on detected system conditions. To achieve such coordinated functionality between the two devices, the OLTC control module 210 and the SCB control module 220 may be communicatively coupled via a communications line 234. By coordinating the operation of the OLTC 206 and SCB 220, control of the voltage profile delivered to the load 204 may be achieved and unnecessary switching operations in both devices may be reduced. For example, in certain conditions, the OLTC control module 210 and SCB control module 220 may collectively determine that control of the voltage profile delivered to the load 204 is better achieved by utilizing the OLTC 206 rather than the SCB 222 and take appropriate action to such effect. Similarly, in certain other conditions, the OLTC control module 210 and SCB control module 220 may collectively determine that control of the voltage profile delivered to the load 204 may be better achieved by utilizing the SCB 222 rather than the OLTC 206 and take appropriate action to such effect.

In certain embodiments, the communications line 234 may be capable of communicating synchronized phasor data (i.e., synchrophasors) between the OLTC control module 210 and the SCB control module 220 used for coordinating the actions of the devices. For example, in some embodiments, the OLTC control module 210 and the SCB control module 220 may each generate synchronized phasor data from the electric power delivery system 200 based on the monitored system data they each receive, as well as a common time reference 236. The common time reference 236 may be provided by any time reference source common to both the OLTC control module 210 and the SCB control module 220 such as, for example, an inter-range instrumentation group (IRIG) satellite based time reference, the WWV time signal from the National Institute of Standards and Technology (NIST), the WWVB time signal from the NIST, a local area network (LAN) time signal, or the like.

The OLTC control module 210 and the SCB control module 220 may communicate synchronized phasor data between each other serially and, in some embodiments, may operate as a real-time controller client and server. In certain embodiments, the synchrophasor data may include voltage or current magnitude information, phase angle information, and other monitored system data information received from the electrical power generator and transmission system 200. In some embodiments, the synchrophasor data may be communicated between the OLTC control module 210 and the SCB control module 220 using, for example, a C37.118 protocol. As discussed previously, based at least in part on the synchrophasor data received from the other device, each of the OLTC control module 210 and the SCB control module 220 may collectively determine how to better control the voltage profile along the line 230 delivered to the load 204.

Figure 4:
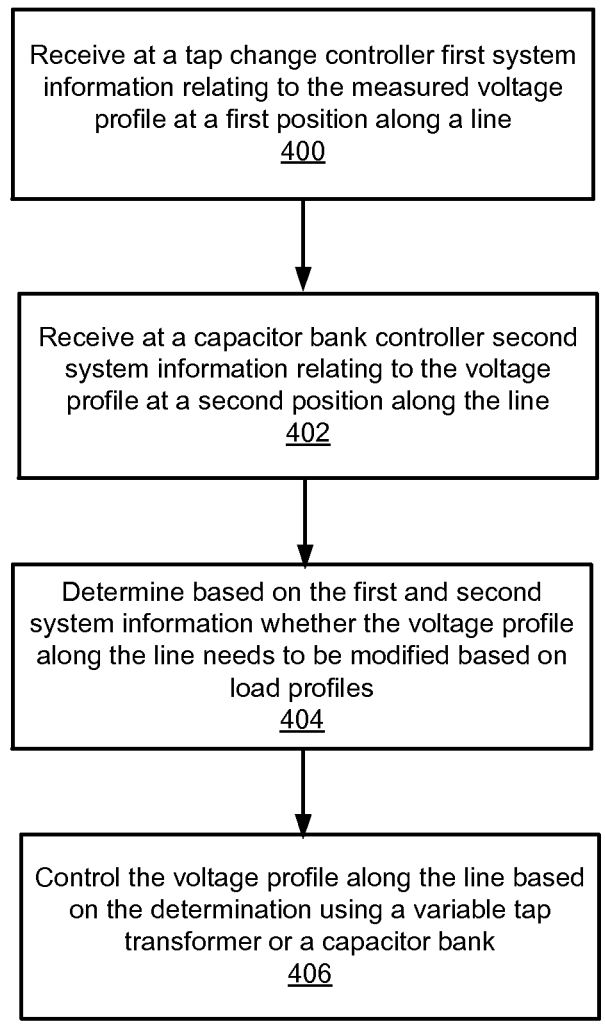
FIG. 4 illustrates a flowchart of a method for controlling electrical power system voltage profiles.

FIG. 4 illustrates a flowchart of a method for controlling electrical power system voltage profiles consistent with embodiments disclosed herein. In step 400 of the method, first system information relating to the voltage profile along a line may be received by a tap change controller. In certain embodiments, the first system information may relate to the voltage profile along the line at a certain position related to the position of a variable tap transformer coupled with the line and the tap change controller. In step 402, second system information related to the voltage profile along the line may be received by a capacitor bank controller. The second system information may relate to the voltage profile along the line at a certain position related to the position of a capacitor bank system selectively coupleable to the line and coupled to the capacitor bank controller.

In step 404 of the method, the tap change controller, the capacitor bank controller, and/or a centralized IED or system communicatively coupled with the tap change controller and/or the capacitor bank controller may determine based on the first and/or second system information whether the voltage profile along the line needs to be changed based on a load profile associated with the line. Based on the determination, at step 406, the tap change controller, the capacitor bank controller, and/or a centralized IED or system may control the voltage profile along the line accordingly by changing the tap position of the variable tap transformer and/or coupling the capacitor bank to the line.

While specific embodiments and applications of the disclosure have been illustrated and described, it is to be understood that the disclosure is not limited to the price configurations and components disclosed herein. Accordingly, many changes may be made to the details of the above-described embodiments without departing from the underlying principles of this disclosure. The scope of the present invention should, therefore, be determined only by the following claims.

What is claimed is:

1. An intelligent electronic device (IED), comprising:
a communication system configured to share system information related to a voltage profile on an electric power line with a variable tap transformer and a shunt capacitor bank, the variable tap transformer including a plurality of tap positions selectively coupleable with the electric power line, and the shunt capacitor bank being selectively coupleable with the electric power line;
a processor communicatively coupled to the communication system; and
a non-transitory computer-readable storage medium communicatively coupled to the processor, the computer-readable storage medium storing a plurality of instructions that when executed by the processor cause the processor to change the voltage profile by controlling one of a tap position of the variable tap transformer and a connection status of the shunt capacitor bank.

2. The IED of claim 1, wherein the IED comprises a tap change controller.

3. The IED of claim 2, wherein the communication system comprises a monitored equipment interface in communication with the variable tap transformer; and
wherein controlling the tap position comprises issuing an instruction to the variable tap transformer via the monitored equipment interface to selectively couple one of the plurality of tap positions with the electric power line.

4. The IED of claim 1, wherein the IED comprises a shunt capacitor bank controller.

5. The IED of claim 4, further comprising:
wherein controlling the connection status of the shunt capacitor bank comprises issuing an instruction to selectively couple the shunt capacitor bank to the electric power line.

6. The IED of claim 5, wherein the instruction is configured to cause a breaker communicatively coupled to the shunt capacitor bank to close to selectively couple the shunt capacitor bank to the electric power line.

7. The IED of claim 1, wherein the IED comprises an automation controller.

8. The IED of claim 1, wherein the first and second system information comprise synchronized phasor information.

9. The IED of claim 1, wherein the first and second system information each comprise one of electric power line voltage information and line current information.

10. The IED of claim 1, further comprising a reference time signal input, and wherein the reference time signal input is used to coordinate a plurality of control instructions to change the voltage profile by operation of one of the variable tap transformer and the shunt capacitor bank.

11. The IED of claim 1, wherein the change to the voltage profile maintains a voltage on the electric power line within a predetermined voltage range.

12. The IED of claim 1, wherein the change to the voltage profile optimizes the voltage profile delivered to a load communicatively couple with the electric power line.

13. A method for controlling a voltage profile delivered to a load in an electric power system, the method comprising:
receiving, by an IED, a first system information from a tap change controller communicatively coupled with a variable tap transformer coupled to an electric power line;
receiving, by the IED, a second system information from a shunt capacitor bank controller communicatively coupled with a shunt capacitor bank including at least one capacitor coupled to the electric power line;
controlling, by one of the tap change controller and the shunt capacitor bank controller, the voltage profile of the electric power line based on the first and second system information using one of the variable tap transformer and the shunt capacitor bank.

14. The method of claim 13, further comprising:
receiving a reference time signal; and
coordinating an operation of one of the shunt capacitor bank and the variable tap transformer based on the reference time signal.

15. The method of claim 13, wherein each of the first system information and the second system information relates to a voltage profile along the electric power line.

16. The method of claim 15, further comprising controlling one of the tap change controller and the shunt capacitor bank controller to maintain the voltage profile along the electric power line within a predetermined voltage range.

17. The method of claim 13, wherein each of the first system information and the second system information comprise synchronized phasor information.

18. The method of claim 13, wherein the each of the first system information and the second system information comprise one of a voltage of the electric power line and a current of the electric power line.

19. The method of claim 13, wherein controlling the voltage profile using the variable tap transformer comprises adjusting a tap position coupled to the electric power line.

20. The method of claim 13, wherein controlling the voltage profile using the shunt capacitor bank comprises selectively coupling the shunt capacitor bank to the electric power line.

* * * * *